(12) United States Patent
Noma (10) Patent No.: US 6,954,493 B2
(45) Date of Patent: Oct. 11, 2005

(54) MODEM APPARATUS, IMAGE COMMUNICATION APPARATUS AND COMMUNICATION CONTROL METHOD

(75) Inventor: Nobuhiko Noma, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 894 days.

(21) Appl. No.: 09/814,709

(22) Filed: Mar. 23, 2001

(65) Prior Publication Data

US 2002/0122475 A1 Sep. 5, 2002

(30) Foreign Application Priority Data

Mar. 31, 2000 (JP) .................................... 2000-099562

(51) Int. Cl.[7] .......................... H04B 1/38; H04L 27/22
(52) U.S. Cl. .................. 375/222; 375/261; 375/324
(58) Field of Search .............................. 375/222, 261, 375/298, 324, 329

(56) References Cited

U.S. PATENT DOCUMENTS

| 4,608,703 A | 8/1986 | Kaga et al. |
| 4,796,279 A | 1/1989 | Betts et al. |
| 6,310,926 B1 * | 10/2001 | Tore ........................... 375/355 |
| 6,311,233 B1 * | 10/2001 | Nishioka et al. ................ 710/14 |
| 6,728,308 B1 * | 4/2004 | Chu et al. ..................... 375/222 |

FOREIGN PATENT DOCUMENTS

WO          95/13675          5/1995

OTHER PUBLICATIONS

"Recommendation V.34", Feb., 1998, pp. 27–66.
International Telecommunication Union: "ITU–T V.34", pp. 1–73, downloaded from http://www.mirror.itu.int/dms/pages/itu-t/rec/v/T-REC-V.34-199802-1.html on May 13, 2004.

* cited by examiner

Primary Examiner—Stephen Chin
Assistant Examiner—Freshteh N. Aghdam
(74) Attorney, Agent, or Firm—Greenblum & Bernstein, P.L.C.

(57) ABSTRACT

When a communication is started through a control channel in a half-duplex communication compliant with the Recommendation V.34, the modem apparatus of the present invention demodulates reception symbols subjected to quadrature amplitude modulation and thereby finds their coordinates on a signal space diagram. Then, the modem apparatus calculates a cross product of two vectors from the origin to the coordinates of two consecutive symbols and identifies a control signal from a polarity array configured by polarities of the calculation result arrayed over a span of a plurality of consecutive symbols.

7 Claims, 8 Drawing Sheets

MODEM APPARATUS, IMAGE COMMUNICATION APPARATUS AND COMMUNICATION CONTROL METHOD

BACKGROUND OF THE INVENTION

1. Field of the Invention

The present invention relates to a modem apparatus that demodulates reception symbols and identifies the type of a control signal, an image communication apparatus equipped with this modem apparatus and communication control method.

2. Description of the Related Art

The Recommendation V.34 on a modem specified by the ITU-T describes a half-duplex system for facsimile communications that executes a protocol for exchanging modem and facsimile control signals according to a full-duplex system using a control channel in addition to a primary channel.

When transmitting an image signal according to the Recommendation V.34, the image communication apparatus on the calling side (hereinafter referred to as "calling terminal") must transmit either a PPh signal or Sh signal at the beginning of a control channel. The PPh signal is used when the communication speed of the next primary channel is negotiated under the exchange protocol of the control signal. On the other hand, the Sh signal is used when the communication speed of the next primary channel need not be negotiated because the communication speed of the next primary channel is already determined.

When an image signal according to the Recommendation V.34 is received, the image communication apparatus on the answering side (hereinafter referred to as "answering terminal") must identify whether the signal received at the beginning of the control channel is a PPh signal or Sh signal. When a PPh signal is received, the answering terminal sends back a PPh signal at the beginning of the next control channel. On the other hand, when an Sh signal is received, the answering terminal sends back an Sh signal or PPh signal at the beginning of the next control channel. Therefore, the calling terminal also needs to identify whether the answering terminal sends an Sh signal or PPh signal at the beginning of the control channel.

Figure 1A:
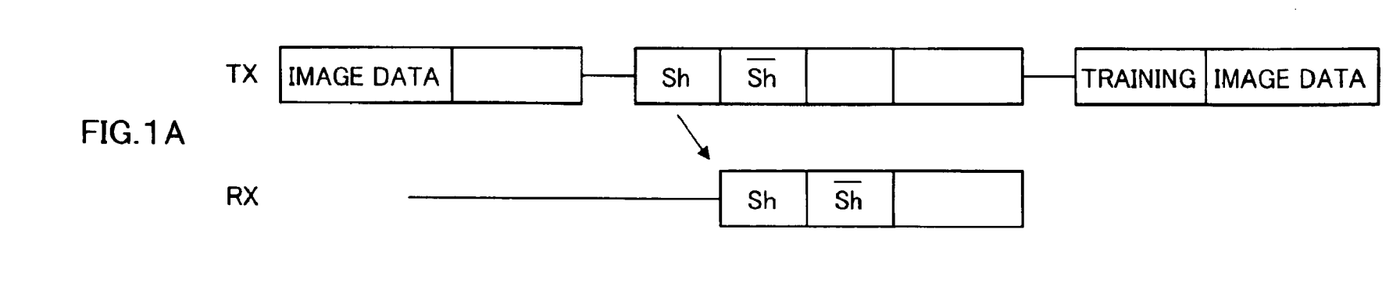
FIG. 1A is a sequence diagram to exchange an Sh signal at the beginning of a control channel in a full-duplex communication of the Recommendation V.34.
Figure 1B:
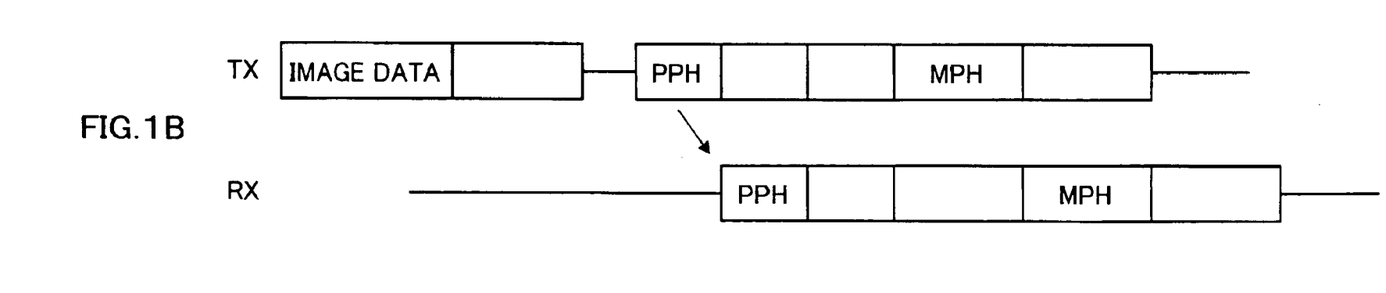
FIG. 1B is a sequence diagram to exchange a PPh signal at the beginning of a control channel in a full-duplex communication of the Recommendation V.34.

FIG. 1A shows a case where the calling terminal (TX) is sending an Sh signal at the beginning of the control channel and the answering terminal (RX) is sending back an Sh signal in response to this. On the other hand, FIG. 1B shows a case where the calling terminal (TX) is sending a PPh signal at the beginning of the control channel and the answering terminal (RX) is sending back a PPh signal in response to this.

Figure 2A:
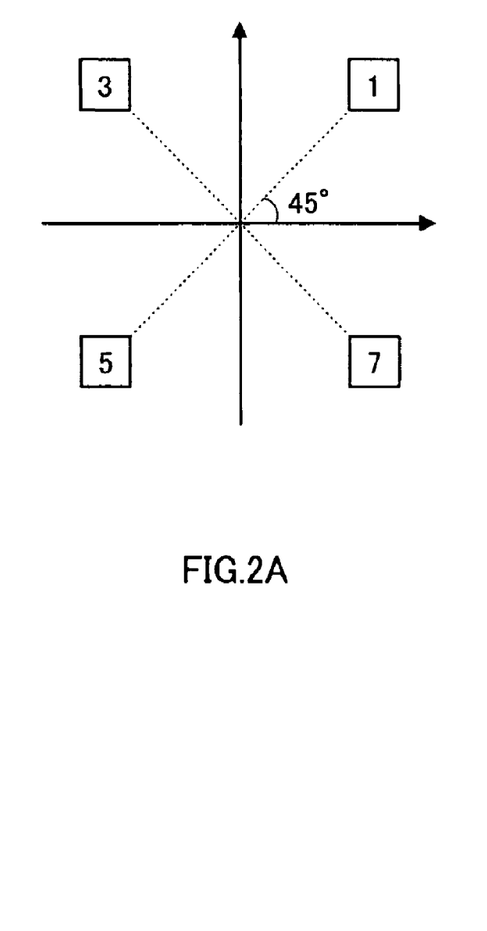
FIG. 2A illustrates states of coordinates of consecutive symbols due to a channel characteristic.

The Recommendation V.34 uses a quadrature amplitude modulation system (e.g., QAM modulation system) as one of modulation systems of control signals (PPh signal, Sh signal, etc.) exchanged on a control channel. FIG. 2A shows a signal space diagram (IQ plane coordinates) in QAM modulation. The QAM modulation system is a system in which phase modulation is performed at a multiple (1 to 8) of 45°, which is a unit angle, in the range of 0° to 360°. That is, symbols that make up the control signal are modulated with a value obtained by multiplying one modulation unit (45°) by one of integers "0", "1", "2", "3", "4", "5", "6" or "7".

The Recommendation V.34 defines modulation patterns for all control signals exchanged on a control channel. In the case of a PPh signal, 8 known symbols are phase-modulated in the order of 11311535 and this is repeated 4 times. In the case of an Sh signal, 8 known symbols are phase-modulated in the order of 13131313 and this is repeated 3 times and then 8 known symbols of an Sh bar signal are phase-modulated in the order of 57575757 and this is sent only once.

The modem apparatus obtains the modulated phase from coordinates of reception symbols in a signal space diagram when reception symbols are QAM-demodulated. Then, when the modulation pattern with which reception symbols are modulated matches the modulation pattern of the PPh signal, the modem apparatus detects that the PPh signal has been received. When the modulation pattern with which reception symbols are modulated matches the modulation pattern of the Sh signal, the modem apparatus detects that the Sh signal has been received.

Figure 2B:
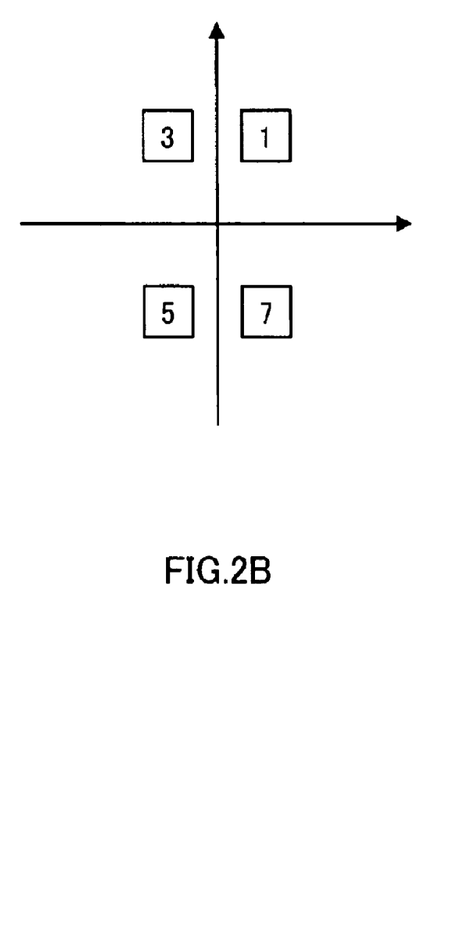
FIG. 2B illustrates a case where coordinates of consecutive symbols come closer to each other due to a channel characteristic.
Figure 2C:
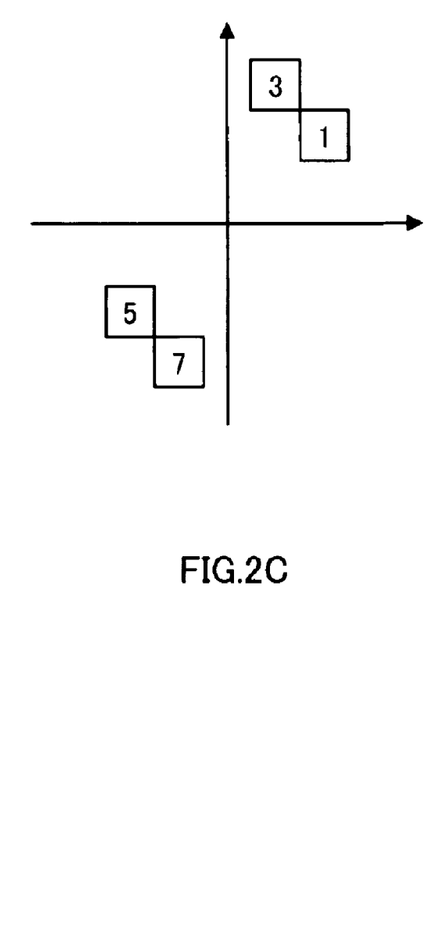
FIG. 2C illustrates a case where coordinates of consecutive symbols rotate due to a channel characteristic.

However, it is sometimes difficult to make a distinction when there is a shift of oscillation frequency between the calling side and answering side or when coordinates of two consecutive symbols come closer to each other or a phase rotation occurs due to influences of the channel characteristic. For example, it is known that when "1" and "3" are repeated as in the case of quadrature amplitude modulation on an Sh signal, the reception state becomes such that the coordinates of a reception symbol corresponding to the modulation of "1" come closer to the coordinates of a reception symbol corresponding to the modulation of "3" as shown in FIG. 2B. In such a reception state, it is difficult to distinguish whether the reception symbol is "1" or "3". FIG. 2C shows a state in which the phase of a reception symbol corresponding to the modulation of "3" further rotates toward the "1" side, and in this way the reception symbols corresponding to "1" and "3" enter into the same quadrant. In such a reception state, it is now difficult to achieve accurate demodulation unless the rotated phase is compensated.

Thus, the conventional way of detecting coordinates on a signal space diagram of reception symbols, determining a modulation pattern of consecutive reception symbols and thereby identifying a control signal (Sh signal, etc.) has a problem that it is difficult to identify a control signal, Sh signal in particular, when coordinates of two consecutive symbols come closer to each other or a phase rotation occurs beyond a quadrant boundary. This means that failing to detect an Sh signal in the control channel will result in an AC sequence, thereby producing considerable time losses.

SUMMARY OF THE INVENTION

It is an object of the present invention to provide a highly reliable modem apparatus, image communication apparatus and communication control method capable of precisely identifying control signals exchanged on a control channel without time losses due to failures in signal detection.

That is, the modem apparatus of the present invention demodulates reception symbols subjected to quadrature amplitude modulation, detects the rotation direction of the reception symbols from two consecutive symbols and identifies a control signal sent at the beginning of the control channel based on he rotation direction of the reception symbols.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, an embodiment of a modem apparatus of the present invention will be explained in detail below. The modem apparatus according to this embodiment performs communications based on a communication protocol compliant with the Recommendation V.34 defined by the ITU-T. That is, in a half-duplex communication compliant with the Recommendation V.34, when a communication is started with a control channel, an Sh signal or PPh signal is exchanged.

Figure 3:
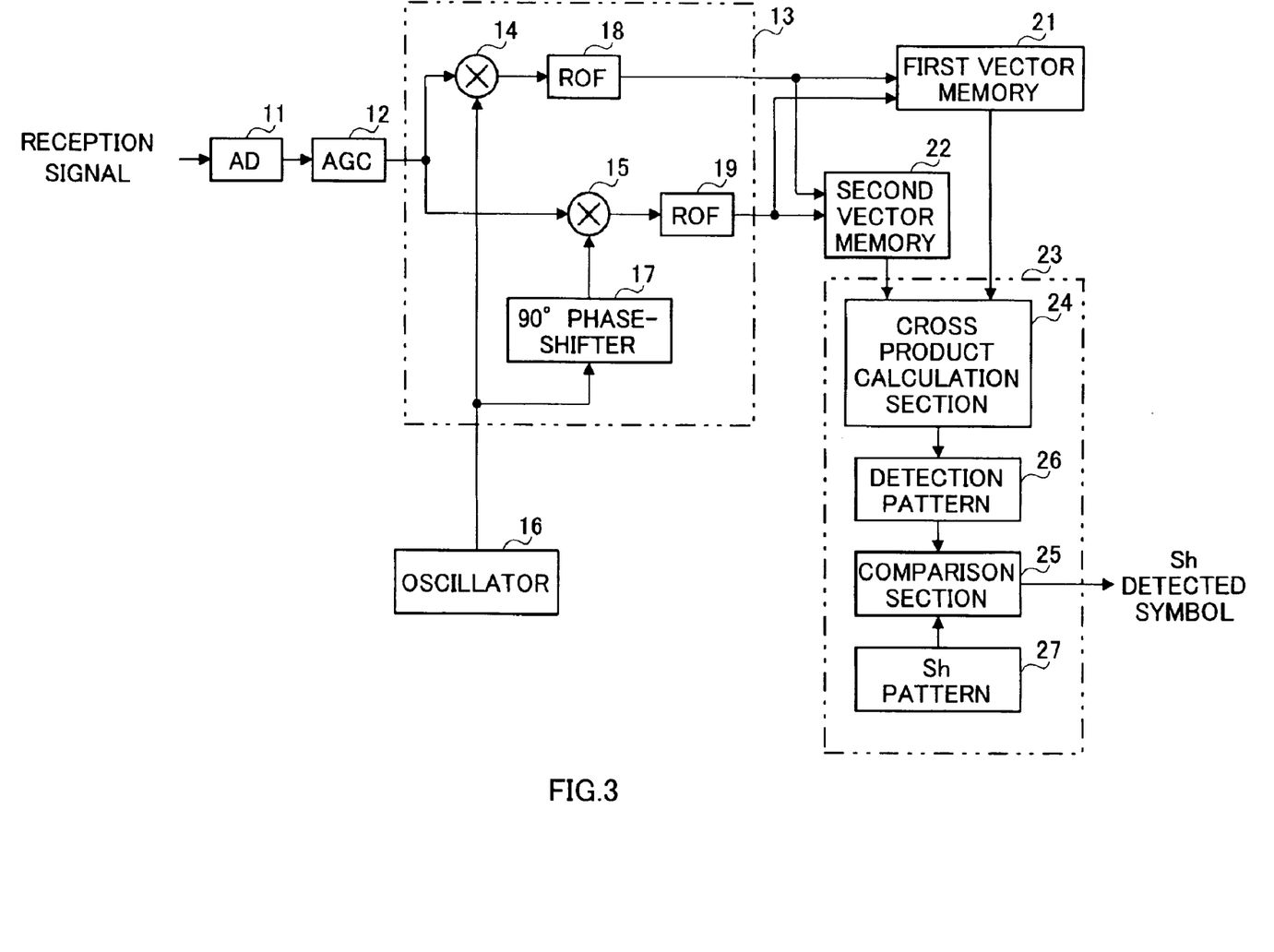
FIG. 3 is a partial functional block diagram of a modem apparatus according to an embodiment of the present invention.

FIG. 3 is a block diagram of the reception system of the modem apparatus according to this embodiment. The transmission system is omitted. In this modem apparatus, a reception signal converted to a digital signal by AD converter 11 is subjected to amplitude adjustment by auto-gain controller 12 and then input to demodulator 13. Demodulator 13 performs quasi-coherent detection on the reception signal using two multipliers 14 and 15. One multiplier 14 extracts an in-phase component from the reception signal subjected to quadrature amplitude modulation (e.g., QAM modulation) by multiplying the reception signal by a carrier frequency generated from oscillator 16. The other multiplier 15 extracts a quadrature component from the reception signal by multiplying the reception signal by a carrier frequency phase-shifted with 90° phase-shifter 17. The in-phase component and quadrature component are stripped of a high-frequency component by roll-off filters 18 and 19 and converted to vector data indicating coordinates on a signal space diagram of reception symbols. The vector data of reception symbols is stored in first vector memory 21 and second vector memory 22 in parallel.

The modem apparatus of this embodiment is provided with Sh detector 23 that detects an Sh signal using vector data of two consecutive symbols stored in first and second vector memories 21 and 22. Here, the PPh detector to detect a PPh signal is not shown.

Sh detector 23 is provided with cross product calculation section 24 that calculates a cross product to detect the rotation direction of vectors of two consecutive symbol and comparison section 25 that compares variation series (detection pattern) 26 in the detected rotation direction of a plurality of consecutive reception symbols with variation series (Sh pattern) 27 in the original rotation direction of the Sh signal and determines whether the reception signal is an Sh signal or not.

Here, the algorithm used by Sh detector 23 to identify the Sh signal will be explained in detail.

Figure 4:
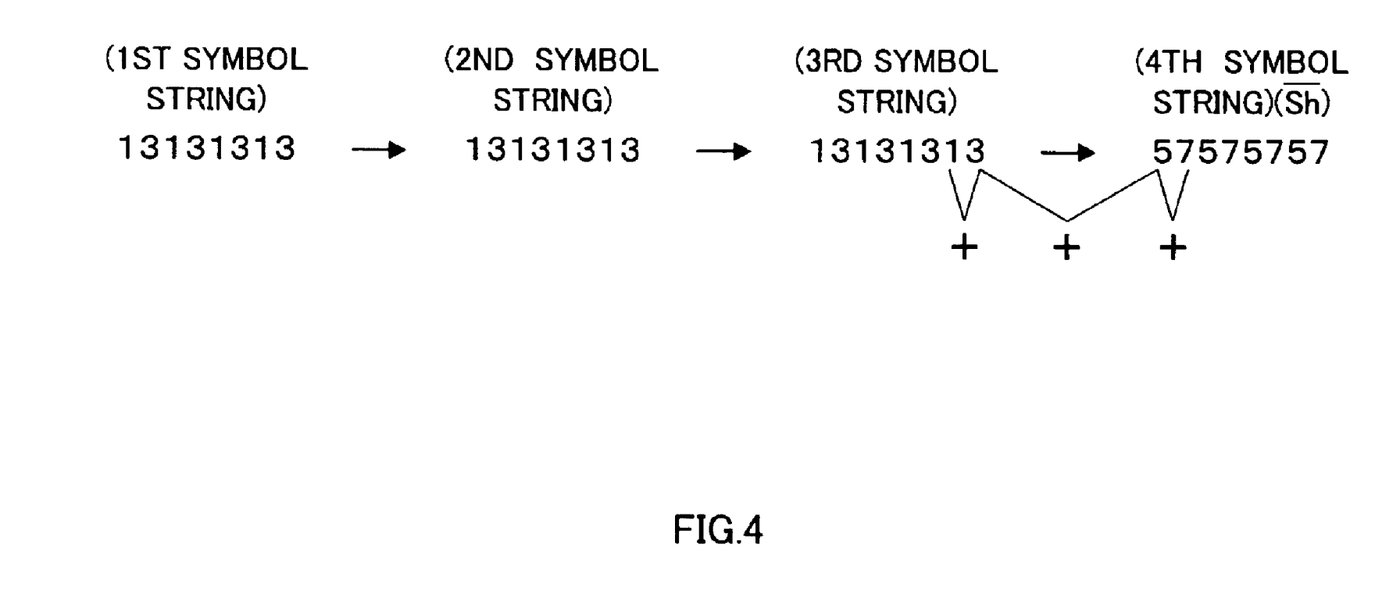
FIG. 4 illustrates a modulation pattern corresponding to symbol strings of an Sh signal and Sh bar signal.

FIG. 4 shows a modulation pattern corresponding to symbol strings of an Sh signal and Sh bar signal. One Sh is configured by 1st, 2nd and 3rd symbol strings, each consisting of 8 symbols of coordinates of repetitive "1" and "3" on a signal space diagram and an Sh bar signal is configured by a 4th symbol string consisting of 4 symbols of coordinates of repetitive "5" and "7" on a signal space diagram.

Figure 5A:
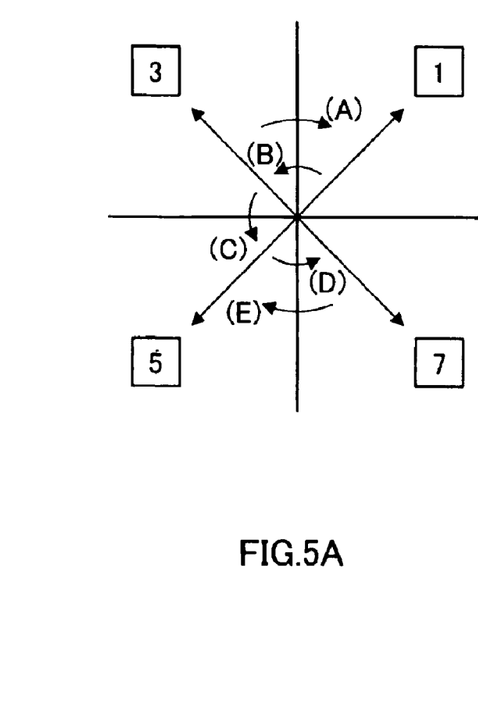
FIG. 5A illustrates the rotation directions of reception symbols on a signal space diagram.
Figure 5B:
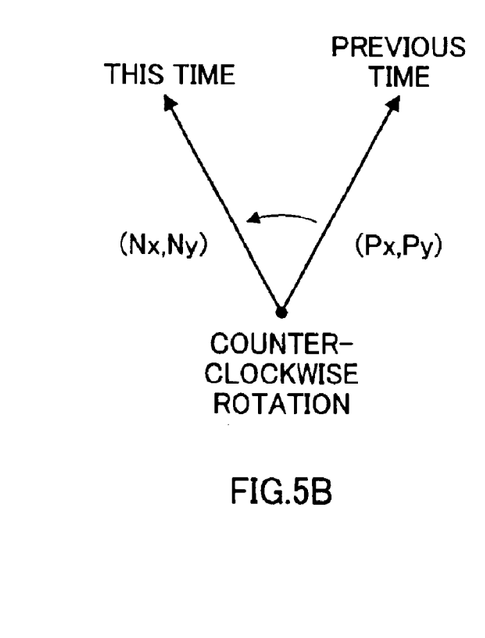
FIG. 5B illustrates a state in which two consecutive symbols rotate counterclockwise.
Figure 5C:
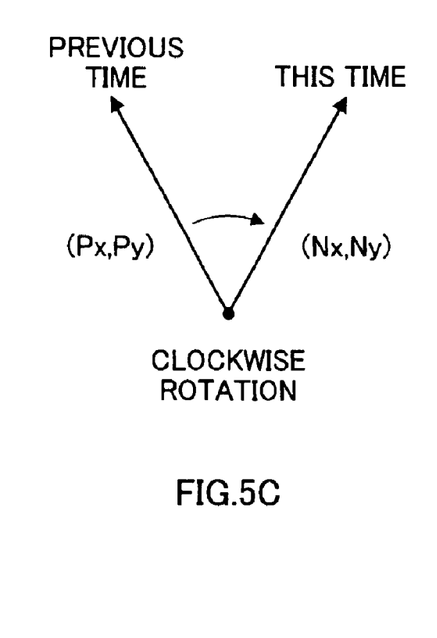
FIG. 5C illustrates a state in which two consecutive symbols rotate clockwise.

Now, suppose symbols subjected to quadrature amplitude modulation on the calling side are demodulated precisely on the answering side. In this case, the coordinates of the reception symbols change sequentially as (13131313) (13131313) (13131313) (57575757). This will be explained more specifically with reference to FIG. 5. In the case of an Sh signal, detection of the reception symbol of coordinate "1" is followed by detection of the reception symbol of coordinate "3" and the detection of the reception symbol of coordinate "3" is followed by detection of the reception symbol of coordinate "1". This is repeated from the beginning to 24th symbol of the Sh signal. When the Sh signal (3rd symbol string) changes to an Sh bar signal (4th symbol string), detection of the reception symbol of coordinate "3" is followed by detection of the reception symbol of coordinate "5" and the detection of the reception symbol of coordinate "5" is followed by detection of the reception symbol of coordinate "7".

As shown in FIG. 5, the change in the coordinates of reception symbols can be seen as a change in the rotation direction. While the Sh signal is being received (period from the 1st symbol string to 3rd symbol string), rotation (B) and rotation (A) are alternated and on the boundary between the Sh signal and Sh bar signal, rotation (C) takes place, and from that point on rotation (D) and rotation (E) are alternated.

A symbol coordinate at the previous reception and a symbol coordinate at the present reception have a relationship in terms of rotation direction between "clockwise" and "counterclockwise". Since the modulation pattern of symbols making up the Sh signal (Sh bar signal) is known, by continuously monitoring the direction of rotation from a symbol coordinate at the previous reception to a symbol coordinate at the present reception, it is possible to identify whether the signal is an Sh signal or not from a series of variations in the rotation direction.

In the case of the Sh signal in particular, a counterclockwise rotation takes place between the 7th symbol and 8th symbol of the 3rd symbol string, a counterclockwise rotation takes place between the 8th symbol of the 3rd symbol string and 1st symbol of the Sh bar signal and a further counterclockwise rotation takes place between the 1st symbol and the 2nd symbol of the Sh bar signal. That is, a "counterclockwise" rotation takes place 3 times consecutively. On the other hand, in the case of the modulation pattern of symbols making up the PPh signal, a "counterclockwise" rotation never takes place 2 times consecutively. Therefore, a symbol can be determined as an Sh signal when coordinates of reception symbols at the beginning of a control channel rotate "counterclockwise" at least two times consecutively.

The following cases can be considered as identification conditions of an Sh signal: When (1) a "counterclockwise" rotation is observed twice consecutively, (2) a "counterclockwise" rotation is observed three times consecutively, (3) a series of variations in the observed rotation direction includes a part that rotates "counterclockwise" two times consecutively, (4) a series of variations in the observed rotation direction includes a part that rotates "counterclockwise" three times consecutively, etc. This embodiment uses a series of variations of immediately preceding 16 symbols as an observation unit and identifies an Sh signal when a part rotating "counterclockwise" two times consecutively appears.

This embodiment uses a cross product calculation to detect the rotation direction between two consecutive reception symbols. By the way, it is also possible to detect the rotation direction between two consecutive reception symbols using a method other than a cross product calculation and using such a method other than a cross product calculation does not depart from the scope of the present invention.

Here, suppose two vectors V1 and V2:

$$V1=[x1, y1, z1], V2=[x2, y2, z2]$$

Then, a cross product of vectors V1 and V2 can be expressed by the following expression:
[Mathematical Expression]

$$V1 \times V2 = \begin{vmatrix} i & j & k \\ x1 & y1 & z1 \\ x2 & y2 & z2 \end{vmatrix}$$

When a rotation on the XY plane is considered, the component in the Z-axis direction becomes 0, $$= \begin{vmatrix} i & j & k \\ x1 & y1 & 0 \\ x2 & y2 & 0 \end{vmatrix}$$

$$= k \begin{vmatrix} x1 & y1 \\ x2 & y2 \end{vmatrix}$$

$$= k(x1y2 - x2y1)$$

where, i,j,k are unit vectors and especially k is a unit vector in the Z-axis direction.

As a result of the cross product calculation of vectors V1 and V2, when $(x1y2-x2y1)>0$, a counterclockwise rotation takes place between vector V1 and vector V2. When $(x1y2-x2y1)<0$, a clockwise rotation takes place between vector V1 and vector V2.

Since a reception symbol (coordinate) can be expressed by a vector made up of the in-phase component (x) and quadrature component (y), it is possible to know the rotation direction by calculating (PxNy−NxPy) as a cross product between the coordinate at the previous reception (Px, Py) the coordinate at the present reception (Nx, Ny) and determining positive or negative.

Figure 6:
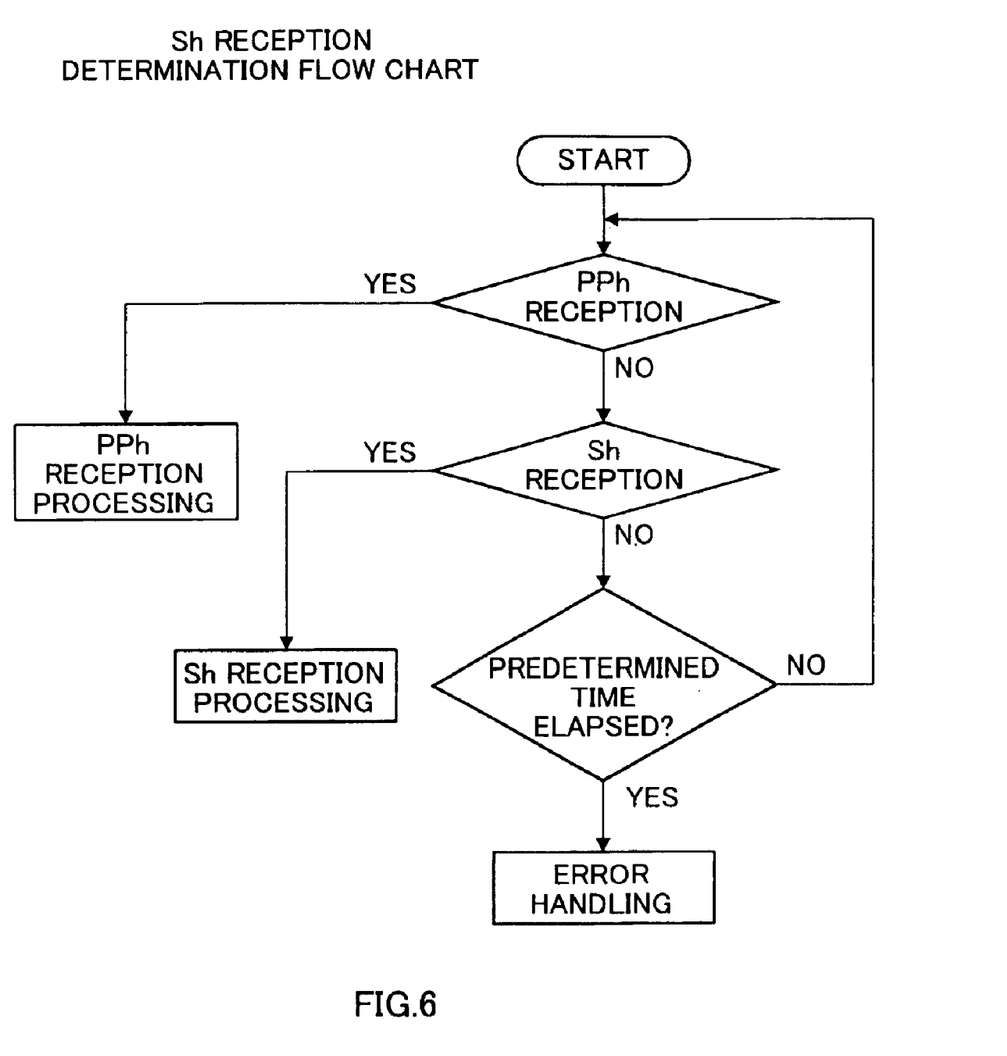
FIG. 6 is a flow chart showing an overall flow for determination of a PPh signal and Sh signal by the modem apparatus according to the embodiment above.

Then, the operation regarding the identification of an Sh signal of the modem apparatus of this embodiment in the above configuration will be explained with reference to the flow charts in FIG. 6 and FIG. 7. FIG. 6 is a flow chart of a PPh determination and Sh determination executed every time a symbol is received. In a control channel, the PPh detector to detect a PPh signal and the Sh detector to detect an Sh signal (Sh bar signal) operate in parallel. For example, the PPh detector and Sh detector are operated once every 1/600 sec in synchronization with the sampling timing of the reception signal at AD converter 11 and in the case where a PPh signal is detected within a predetermined time (e.g., 3 sec), the process moves on to PPh reception processing or in the case where an Sh signal is detected, the process moves on to Sh reception processing. In the case where neither PPh signal nor Sh signal is detected within the predetermined time (e.g., 3 sec), the process moves on to error handling.

In this embodiment, the PPh detector determines whether a pattern of coordinates of predetermined consecutive symbols received in the past matches the modulation pattern of the PPh signal or not and in the case where these two patterns match, the PPh detector turns on a flag indicating that the PPh signal has been detected.

On the other hand, Sh detector 23 executes the above described cross product calculation between two consecutive symbols, finds the rotation direction of the vectors, stores these rotation directions one by one and when the pattern of variations in the rotation direction of the stored predetermined past symbols matches the pattern of an Sh signal and Sh bar signal, the Sh detector 23 turns on a flag indicating that the Sh signal has been detected.

Figure 7:
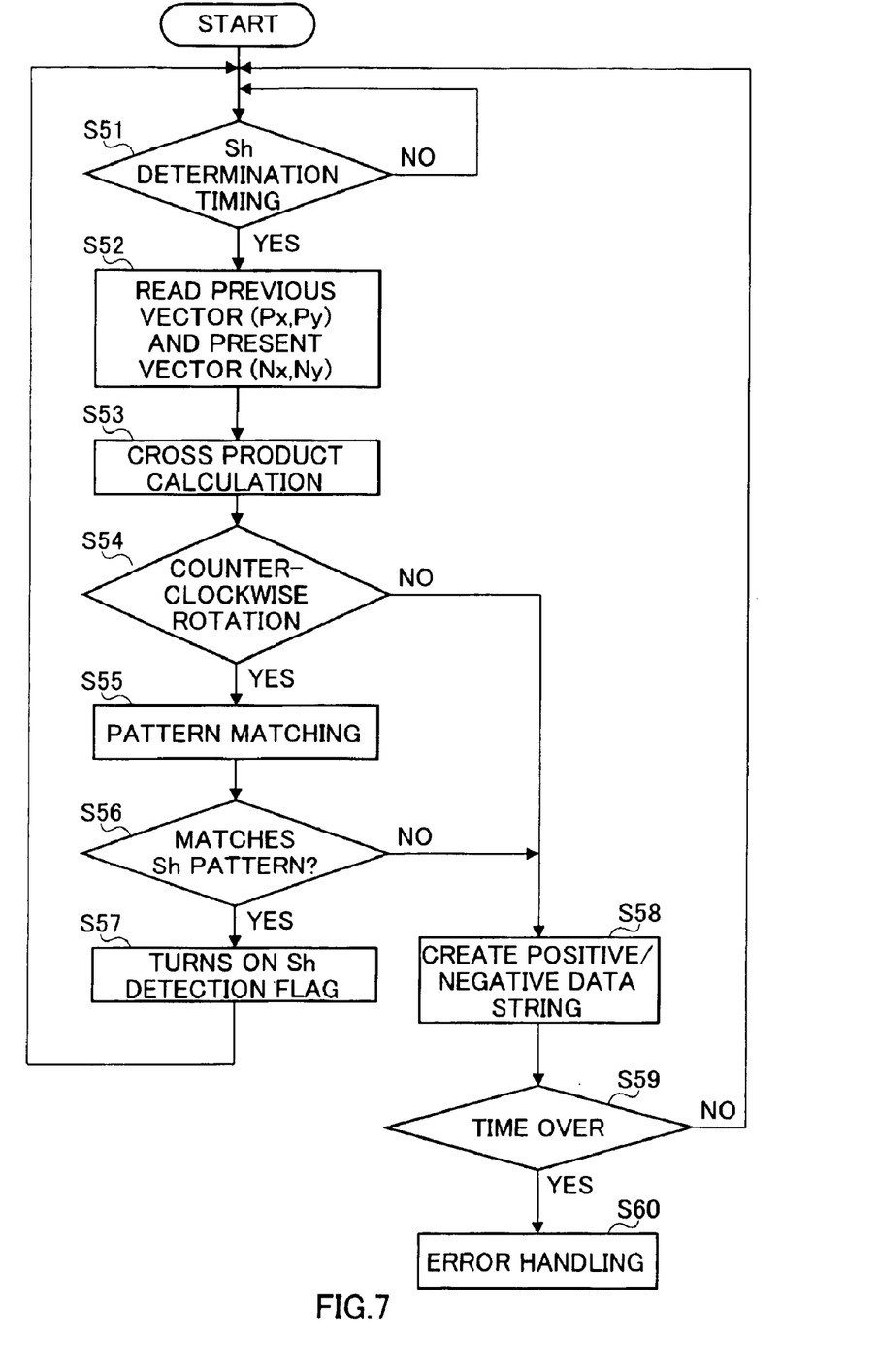
FIG. 7 is a flow chart for determination of an Sh signal by the modem apparatus according to the embodiment above.

FIG. 7 is a flow chart used by Sh detector 23 to identify an Sh signal. The reception symbols demodulated by demodulator 13 are stored in first vector memory 21 and second vector memory 22.

At an Sh determination timing synchronized with the timing at which coordinates of reception symbols (vector data) are written in memory (S51), Sh detector 23 reads the previous vector (Px, Py), which is the coordinate of the previously received symbol and the present vector (Nx, Ny), which is the coordinate of the presently received symbol from one vector memory that stores the vector data of the two consecutive symbols to be determined this time (S52).

Then, Sh detector 23 calculates (PxNy−NxPy) as a cross product between the previous vector (Px, Py) and the present vector (Nx, Ny) (S53). As a result, in the case where the polarity of (PxNy−NxPy) is "positive", Sh detector 23 determines that the rotation is counterclockwise and in the case where the polarity of (PxNy−NxPy) is "negative", Sh detector 23 determines that the rotation is clockwise (S54). In the case of a clockwise rotation, Sh detector 23 branches to step S58 and inserts the determination result this time at the end of the positive/negative data string. In the case where the number of data items making up the positive/negative data string reaches 16 bits, Sh detector 23 discards the oldest data. After confirming that it is not time over yet (S59), Sh detector 23 goes back to step S51 above.

On the other hand, in the case where it is determined by the processing in step S54 above that the rotation is counterclockwise, Sh detector 23 branches to step S55 and executes pattern matching to identify whether the signal is an Sh signal or not. By comparing the positive/negative data string (detection pattern) with the latest positive/negative determination result obtained this time inserted at the end with the Sh pattern of the Sh signal stored beforehand, Sh detector 23 determines whether these two patterns match or not (S56). If these two patterns match, Sh detector 23 turns on a flag indicating that an Sh signal has been detected (S57).

More specifically, in the case where the modem apparatus has received an Sh signal, the pattern matching in step S55 is executed only when the 7th symbol of the 3rd symbol string of the Sh signal is the previously received symbol and the 8th symbol is the presently received symbol, and until this happens the positive/negative data string is updated in step S58. When the 8th symbol of the 3rd symbol string is the previously received symbol and the 1st symbol of the Sh bar signal is the presently received symbol, second pattern matching is executed in step S55 and then the detection pattern matches the Sh pattern. That is, the Sh pattern is (+ − + − + − + − + − + − + +).

As described above, the Sh pattern only needs to include an Sh-signal-specific pattern (+ +), and therefore Sh pattern=(+ +) or (+ + +) is also possible.

Figure 8:
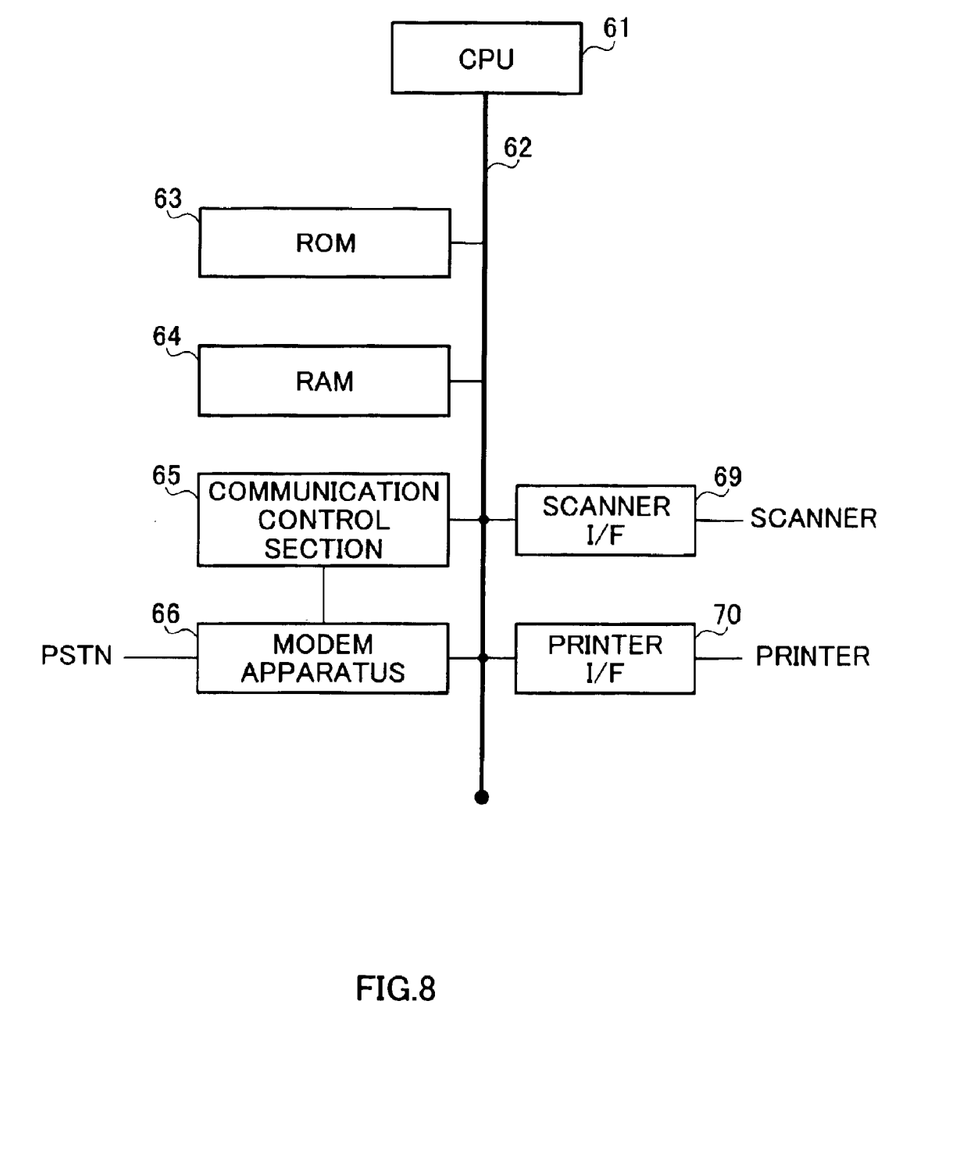
FIG. 8 is a functional block diagram of a facsimile apparatus equipped with the modem apparatus according to the embodiment above.

FIG. 8 shows an example of a facsimile apparatus, one of image communication apparatuses, provided with the modem apparatus above. CPU 61 exchanges signals with ROM 63, RAM 64, communication control section 65, present modem apparatus 66, scanner interface 69 and printer interface 70 via bus 62. ROM 63 stores various programs to make CPU 61 execute various kinds of control including the control of the modem apparatus 66 above. RAM 64 serves as a work area for CPU 61 or an area to temporarily save an image signal. Scanner interface 69 provides an interface with a scanner, which is not shown. Printer interface 70 provides an interface with a printer, which is not shown. Modem apparatus 66 performs communication control under instructions from CPU 61. The image communication apparatus to which this modem apparatus 66 is applicable is not limited to a facsimile apparatus.

As shown above, this embodiment is designed to identify an Sh signal based on a pattern of the rotation directions of reception symbols, and therefore even if coordinates of two consecutive symbols come closer to each other due to a channel characteristic, etc. this embodiment can accurately determine the rotation direction if there is a phase shift, however small it may be, and can thereby accurately identify the Sh signal, thus preventing time losses involved in Sh detection errors.

The above described embodiment describes the case of identifying an Sh signal, but in the case of a signal whose modulation pattern is known, it is possible to detect the rotation direction and identify the signal from this pattern.

As detailed above, the present invention can provide a highly reliable modem apparatus, image communication apparatus and communication control method capable of precisely identifying a control signal exchanged through a control channel without time losses involved in signal detection errors.

The present invention is not limited to the above described embodiments, and various variations and modifications may be possible without departing from the scope of the present invention.

This application is based on the Japanese Patent Application No. 2000-099562 filed on Mar. 31, 2000, entire content of which is expressly incorporated by reference herein.

What is claimed is:

1. A modem apparatus comprising:
a demodulator configured to demodulate a received symbol subjected to quadrature amplitude modulation;
a memory configured to store the demodulated symbol; and
a controller configured to detect coordinates of the demodulated symbols on a signal space diagram, to calculate a cross product of two vectors from the origin of the signal space diagram to the detected coordinates of two consecutive demodulated symbols, to obtain a polarity array of the calculation result over a plurality of consecutive demodulated symbols, and to determine a rotation direction of the demodulated symbol, based on the obtained polarity array,
the controller being further configured to determine that the received symbol is a Sh signal when positive polarity appears at least two times consecutively in the polarity array after a communication in compliance with Recommendation V.34 begins through a control channel.

2. An image communication apparatus equipped with a modem apparatus according to claim 1.

3. A communication control method comprising:
demodulating a received symbol subjected to quadrature amplitude modulation;
detecting coordinates of the demodulated symbol on a signal space diagram;
calculating a cross product of two vectors from the origin of the signal space diagram to the detected coordinates of two consecutive demodulated symbols;
obtaining a polarity array of the calculation result over a plurality of consecutive demodulated symbols;
determining a rotation direction of the demodulated symbol, based on the obtained polarity array; and
determining that the received signal is a Sh signal when positive polarity appears at least two times consecutively in the polarity array when a communication in compliance with Recommendation V.34 begins through a control channel.

4. A modem apparatus operating according to Recommendation V.34 that receives one of a PPh signal and a Sh signal at the beginning of a communication on a control channel, the modem apparatus comprising:
a demodulator configured to demodulate a received symbol, the received symbol being modulated in quadrature amplitude modulation; and
a controller configured to detect a first rotation direction from a first demodulated symbol on a signal space diagram to a second demodulated symbol on the signal space diagram, and to detect a second rotation direction from the second demodulated symbol on the signal space diagram to a third demodulated symbol on the signal space diagram, the first demodulated symbol, the second demodulated symbol, and the third demodulated symbol being consecutively demodulated,
the controller being configured to determine receipt of the Sh signal when the first rotation direction and the second rotation direction are detected to be a same direction on the signal space diagram.

5. The modem apparatus according to claim 4, wherein the same direction comprises a counterclockwise direction.

6. An image communication apparatus equipped with a modem apparatus according to claim 4.

7. A communication control method for a communication in accordance with Recommendation V.34 that receives one of a PPh signal and a Sh signal at the beginning of a communication on a control channel, the communication control method comprising:

demodulating a received symbol, the received symbol being modulated in quadrature amplitude modulation;

detecting a first rotation direction from a first demodulated symbol on a signal space diagram to a second demodulated symbol on the signal space diagram;

detecting a second rotation direction from the second demodulated symbol on the signal space diagram to a third demodulated symbol on the signal space diagram, the first demodulated symbol, the second demodulated symbol, and the third demodulated symbol being consecutively demodulated; and     determining that the received signal is a Sh signal when the first rotation direction and the second rotation direction are detected to be a same direction on the signal space diagram.

\* \* \* \* \*